(12) United States Patent
Hudson et al.

(10) Patent No.: US 9,874,021 B2
(45) Date of Patent: Jan. 23, 2018

(54) TILE AND SLATE ROOF FLASHING SYSTEMS

(71) Applicant: SolarCity Corporation, San Mateo, CA (US)

(72) Inventors: Tyrus Hudson, San Rafael, CA (US); Martin Seery, San Rafael, CA (US); River Broussard, San Rafael, CA (US); Malcolm Kimberley, London (GB)

(73) Assignee: SOLARCITY CORPORATION, San Mateo, CA (US)

( * ) Notice: Subject to any disclaimer, the term of this patent is extended or adjusted under 35 U.S.C. 154(b) by 26 days.

(21) Appl. No.: 14/986,039

(22) Filed: Dec. 31, 2015

(65) Prior Publication Data

US 2017/0058532 A1 Mar. 2, 2017

Related U.S. Application Data

(60) Provisional application No. 61/211,649, filed on Aug. 28, 2015.

(51) Int. Cl.
| | |
|---|---|
| *E04D 13/18* | (2014.01) |
| *E04D 13/147* | (2006.01) |
| *E04D 1/14* | (2006.01) |
| *H02S 20/25* | (2014.01) |
| *F24J 2/00* | (2014.01) |

(52) U.S. Cl.
CPC ........... *E04D 13/1473* (2013.01); *E04D 1/14* (2013.01); *F24J 2/00* (2013.01); *H02S 20/25* (2014.12)

(58) Field of Classification Search
CPC .. F24J 2/5245; F24J 2002/5294; F24J 2/0455; E04D 1/36; E04D 1/30; E04D 1/24; Y02E 10/47; H02S 20/25
USPC ........................................................ 52/173.3
See application file for complete search history.

(56) References Cited

U.S. PATENT DOCUMENTS

| | | | |
|---|---|---|---|
| 4,512,119 A | 4/1985 | Willoughby | |
| 4,965,971 A * | 10/1990 | Jean-Jacques | ...... E04D 13/1471 285/44 |
| 5,226,263 A * | 7/1993 | Merrin | ................ E04D 13/1476 285/42 |
| 5,603,187 A * | 2/1997 | Merrin | .................... E04D 13/12 248/237 |
| 6,360,497 B1 * | 3/2002 | Nakazima | ................. E04D 1/24 126/622 |
| 6,365,824 B1 * | 4/2002 | Nakazima | ............. H01L 31/048 136/244 |

(Continued)

FOREIGN PATENT DOCUMENTS

| | | |
|---|---|---|
| CN | 201839228 U | 5/2011 |
| CN | 201887681 U | 6/2011 |

(Continued)

*Primary Examiner* — Gisele Ford
(74) *Attorney, Agent, or Firm* — Kilpatrick Townsend & Stockton LLP

(57) ABSTRACT

A flashing system and assembly for slate or tile roofs having a flashing and a flashing cap. The flashing is shaped to replace a plurality of removed slates or tiles. The flashing cap has an adjustable position such that the position of a mounting rail support system passing through the flashing can be adjusted with respect to the flashing while still maintaining a watertight seal with the flashing cap and optional sealing cap.

16 Claims, 13 Drawing Sheets

(56) References Cited

U.S. PATENT DOCUMENTS

| | | | |
|---|---|---|---|
| 6,453,629 B1 * | 9/2002 | Nakazima | F24J 2/4614 136/248 |
| 6,489,552 B2 * | 12/2002 | Yamawaki | E04D 1/30 136/244 |
| 6,506,970 B2 * | 1/2003 | Yamawaki | E04D 1/30 136/244 |
| 6,959,520 B2 | 11/2005 | Hartman | |
| 7,690,083 B2 | 4/2010 | Ramsauer | |
| 7,748,189 B2 * | 7/2010 | Fujii | E04D 1/16 52/518 |
| 7,758,011 B2 * | 7/2010 | Haddock | E04F 13/0821 248/500 |
| 7,797,883 B2 | 9/2010 | Tarbell et al. | |
| 7,861,485 B1 | 1/2011 | Wentworth et al. | |
| 7,866,099 B2 | 1/2011 | Komamine et al. | |
| 8,109,048 B2 | 2/2012 | West et al. | |
| 8,122,648 B1 | 2/2012 | Liu | |
| 8,146,299 B2 | 4/2012 | Stearns et al. | |
| 8,176,693 B2 | 5/2012 | Abbott et al. | |
| 8,191,321 B2 | 6/2012 | McClellan et al. | |
| 8,250,829 B2 | 8/2012 | McPheeters et al. | |
| 8,375,654 B1 | 2/2013 | West et al. | |
| 8,549,793 B1 * | 10/2013 | Gens | F24J 2/5245 52/302.6 |
| 8,720,131 B2 | 5/2014 | Urban et al. | |
| 8,733,718 B2 * | 5/2014 | Corsi | E04B 1/40 248/205.1 |
| 8,752,338 B2 * | 6/2014 | Schaefer | F24J 2/5245 52/173.3 |
| 8,756,881 B2 | 6/2014 | West et al. | |
| 8,763,978 B2 | 7/2014 | Newman et al. | |
| 8,776,456 B1 | 7/2014 | Schrock | |
| 8,904,718 B2 | 12/2014 | Schick et al. | |
| 8,962,973 B2 | 2/2015 | Sinicco et al. | |
| 9,097,443 B2 | 8/2015 | Liu et al. | |
| 9,134,044 B2 * | 9/2015 | Stearns | F24J 2/5245 |
| 9,166,524 B2 | 10/2015 | West et al. | |
| 9,194,130 B1 * | 11/2015 | Stanley | E04B 1/66 |
| 9,212,833 B2 * | 12/2015 | Stearns | F24J 2/5245 |
| 9,447,988 B2 * | 9/2016 | Stearns | F24J 2/00 |
| 2002/0043277 A1 * | 4/2002 | Yamawaki | E04D 1/30 136/244 |
| 2005/0044807 A1 | 3/2005 | Rillie et al. | |
| 2005/0074581 A1 * | 4/2005 | Albright | E04D 1/20 428/151 |
| 2008/0302030 A1 * | 12/2008 | Stancel | H01L 31/02008 52/173.3 |
| 2009/0000222 A1 * | 1/2009 | Kalkanoglu | E04D 1/20 52/173.3 |
| 2010/0043319 A1 * | 2/2010 | Bennett | E04D 1/30 52/173.3 |
| 2010/0064605 A1 * | 3/2010 | Corvaglia | H01L 31/0543 52/173.3 |
| 2010/0170163 A1 * | 7/2010 | Tarbell | F24J 2/5205 52/27 |
| 2010/0192505 A1 * | 8/2010 | Schaefer | A47B 96/14 52/653.2 |
| 2011/0000525 A1 | 1/2011 | Wu et al. | |
| 2011/0001030 A1 | 1/2011 | Hochreiter et al. | |
| 2012/0102854 A1 | 5/2012 | Meier et al. | |
| 2012/0144760 A1 * | 6/2012 | Schaefer | E04C 3/06 52/58 |
| 2012/0204500 A1 * | 8/2012 | Segers | E04D 13/1407 52/173.3 |
| 2012/0233958 A1 * | 9/2012 | Stearns | E04D 13/10 52/708 |
| 2012/0301661 A1 | 11/2012 | West et al. | |
| 2013/0009025 A1 * | 1/2013 | Stearns | E04D 13/10 248/237 |
| 2013/0074441 A1 * | 3/2013 | Stearns | E04D 13/10 52/705 |
| 2013/0087186 A1 * | 4/2013 | Pelman | H01L 31/042 136/251 |
| 2013/0091787 A1 * | 4/2013 | Puga | F16B 5/0275 52/173.3 |
| 2014/0053891 A1 | 2/2014 | West et al. | |
| 2014/0158184 A1 * | 6/2014 | West | H02S 20/24 136/251 |
| 2014/0175244 A1 | 6/2014 | West et al. | |
| 2014/0331594 A1 * | 11/2014 | Stearns | H01Q 1/1207 52/705 |
| 2015/0075100 A1 | 3/2015 | West et al. | |
| 2015/0143760 A1 | 5/2015 | Daniels | |

FOREIGN PATENT DOCUMENTS

| | | |
|---|---|---|
| CN | 202189802 U | 4/2012 |
| CN | 202796986 U | 3/2013 |
| CN | 103348490 A | 10/2013 |
| DE | 102006025036 B4 | 4/2008 |
| DE | 102012011563 A1 | 12/2013 |
| EP | 2592365 A2 | 5/2013 |
| EP | 2721354 B1 | 12/2014 |
| FR | 2956681 A1 | 8/2011 |
| JP | 2007051439 A | 3/2007 |
| JP | 5291693 B2 | 9/2013 |
| WO | 2013119218 A1 | 8/2013 |

* cited by examiner

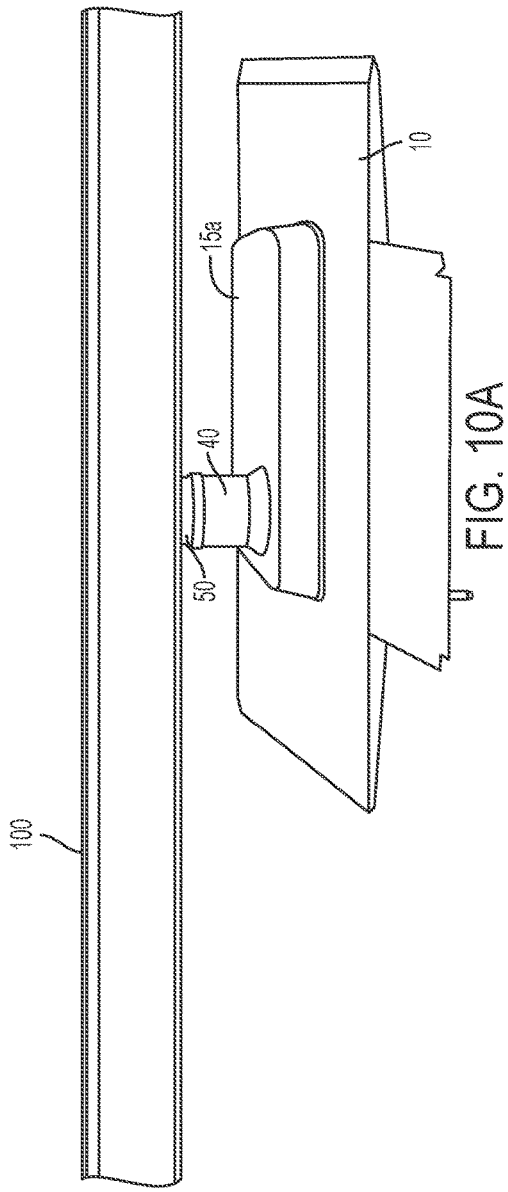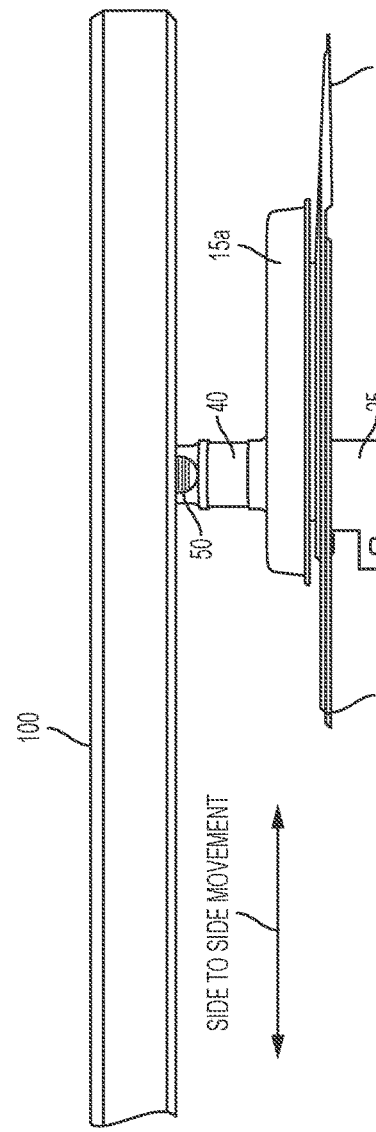

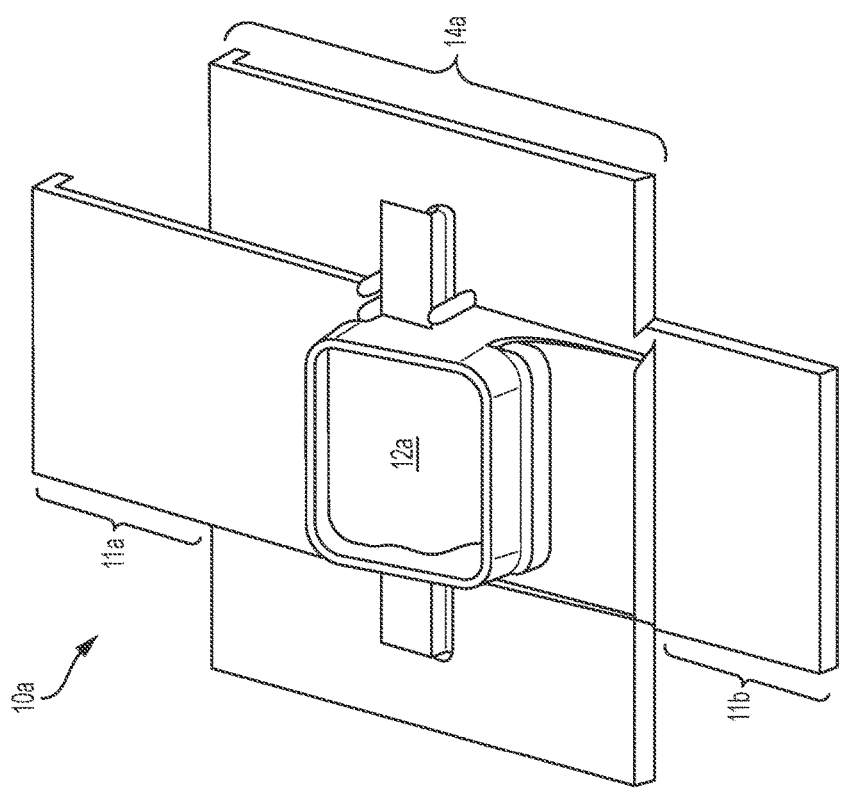

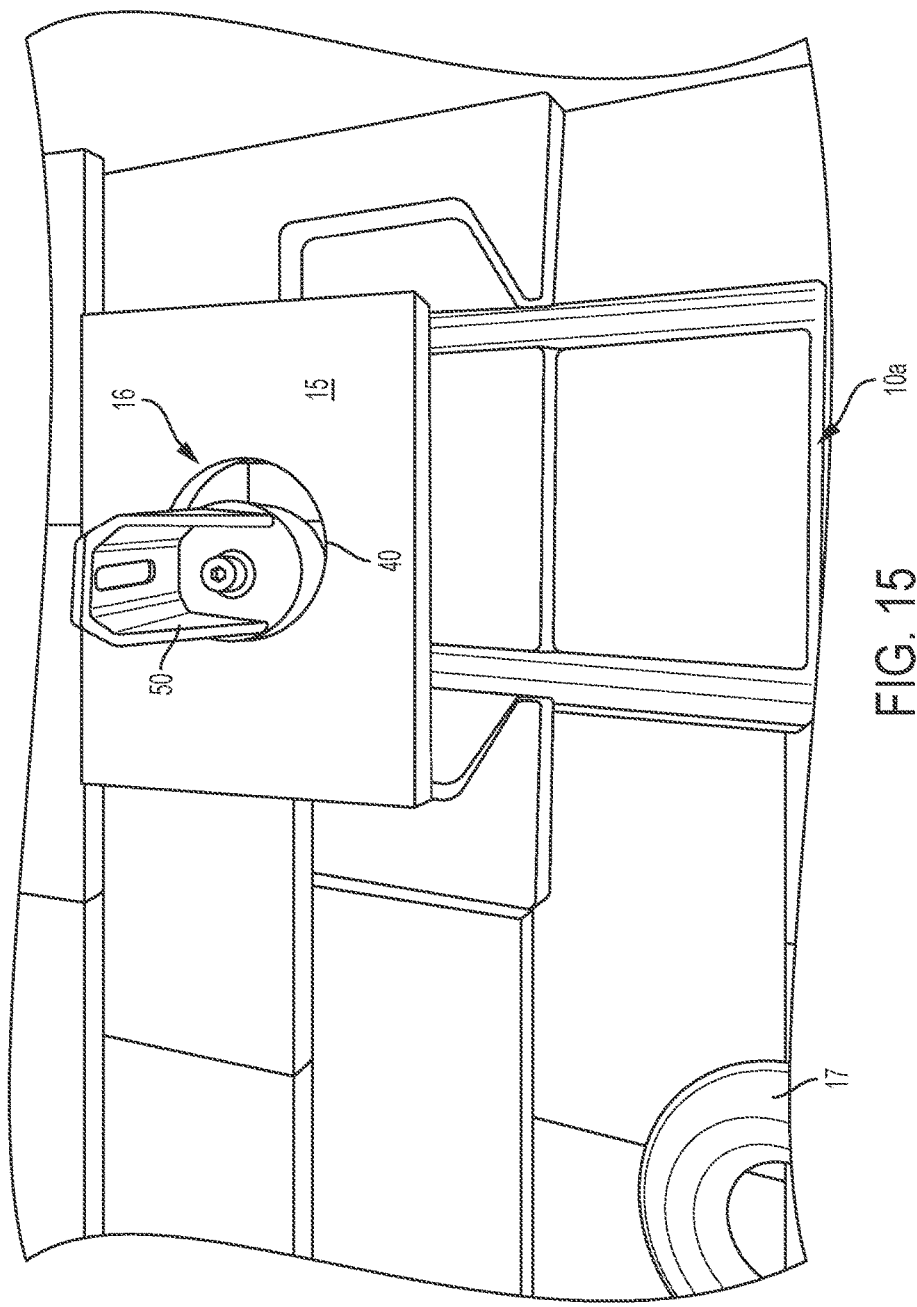

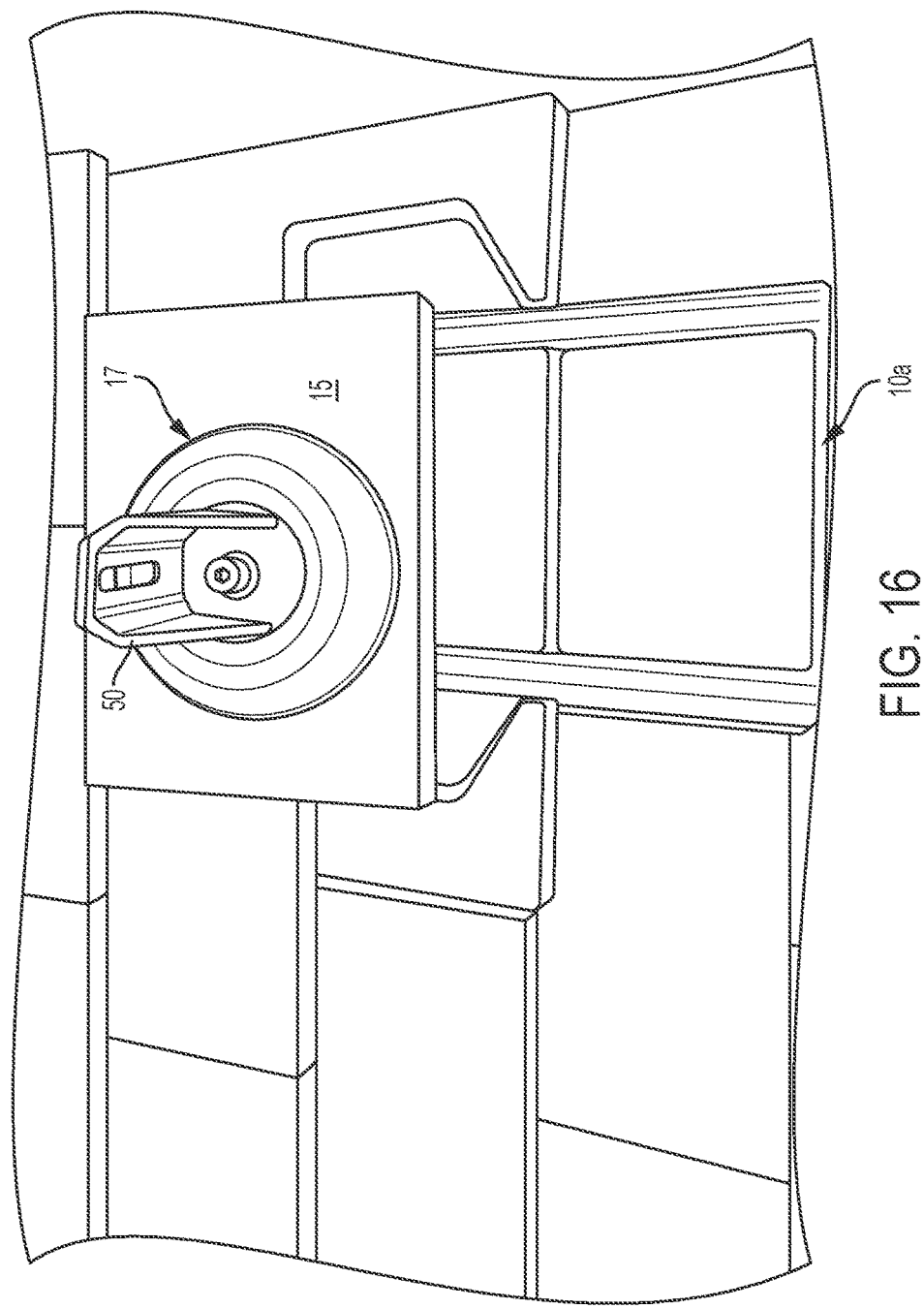

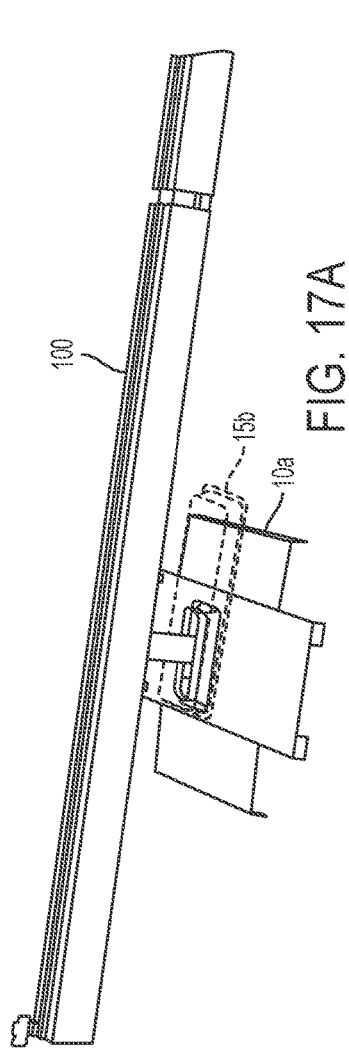
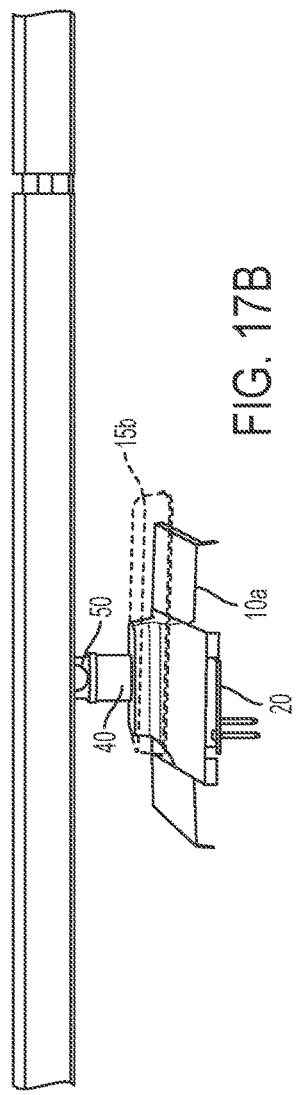
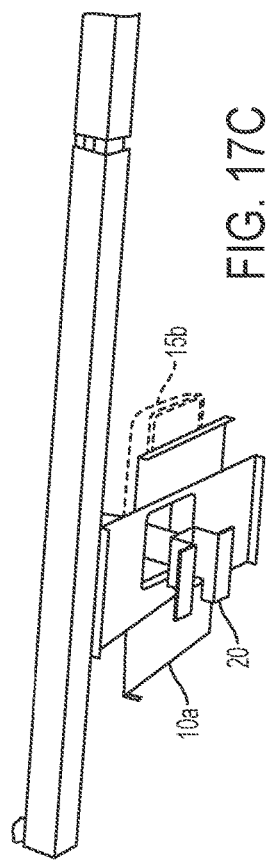
FIG. 17A
FIG. 17B
FIG. 17C

TILE AND SLATE ROOF FLASHING SYSTEMS

CROSS-REFERENCE TO RELATED APPLICATIONS

This claims the benefit of priority to U.S. Provisional Application No. 62/211,649, titled "TILE AND SLATE ROOF FLASHING SYSTEMS" and filed on Aug. 28, 2015, which is herein incorporated by reference in its entirety. This further incorporates by reference in their entireties U.S. patent application Ser. No. 14/986,025 titled "SUPPORT SYSTEM FOR PHOTOVOLTAIC MOUNTING RAIL HAVING CYLINDRICAL BASE THAT ROTATES INTO A LOCKED POSITION" and U.S. patent application Ser. No. 14/986,033 titled "PHOTOVOLTAIC MOUNTING RAIL CONNECTOR WITH DROP-DOWN CONNECTION TO FIRST PHOTOVOLTAIC MODULE AND SLIDE-IN CONNECTION TO SECOND PHOTOVOLTAIC MODULE", both being filed concurrently on the same day as this application.

TECHNICAL FIELD

This relates to photovoltaic mounting systems and systems for securing photovoltaic modules.

BACKGROUND OF THE INVENTION

Photovoltaic modules generally require some form of mounting structure in order to be mounted on a roof. In some cases, portions of a roof, such as slate or tiles set upon a roof base, need to be removed in order to place a mounting structure that can further support photovoltaic modules and an overall solar panel array. The size of slates and tiles, as well as the pattern of how slates and tiles are set upon a roof, can be complicated, requiring the removal of more than merely one slate or tile member to access the underlying roof structure. For example, double headlap roof installations, as used with slate roof installations, can make access to roof rafters particularly challenging.

Accordingly, there is a need for solar panel mounting systems that can maintain the integrity of a roof against precipitation where portions of the roof are removed to accommodate placement of mounting structures and related systems.

BRIEF SUMMARY OF THE INVENTION

Flashing systems for use with slate or tile roofs are provided. In various aspects, a system can include a flashing that replaces a plurality of roof tiles or roof slates and a flashing cap, or flashing cap and sealing cap, that are received over an aperture in the flashing. An advantage of this system is that the flashing can be installed quickly and easily onto the roof structure, and can be specifically dimensioned to replace a plurality of roof tiles or roof slates with one flashing shape.

An aperture in the flashing can be dimensioned to receive a portion of a mounting rail support system passing therethrough. According to some aspects, the exact position of the flashing cap over the aperture can be varied, for example, with respect to the flashing itself to permit the support body of the mounting rail support system to be positioned at the preferred location within the aperture in the flashing. This flexibility in design is especially advantageous in that the geometry of any given building rafters and battens may be varied with respect to the positions of the edges of the tiles or slates from one building roof to the next. Accordingly, the aperture in the flashing can be large enough to permit the mounting rail support system to be located at various positions within the aperture in the flashing. As a result, the flashing position can be matched to the geometry of the tiles or slates and the position of the mounting rail support assembly can be matched to the geometry of the rafters and battens in the roof.

A gasket can also be provided around the aperture in the flashing and the flashing can be installed directly on top of the gasket. The flashing cap may be larger than the aperture in the flashing such that the flashing cap maintains a seal against the gasket, even in cases where the flashing has been moved side-to-side or front-to-back over the aperture in the flashing. A sealing cap can be positioned or received over the top of an aperture in the flashing cap, through which the mounting rail support assembly extends.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 10A is a first perspective view of an alternate flashing system for use with a slate roof, according to aspects of the present disclosure.

FIG. 10B is a second perspective view of the alternate flashing system of FIG. 10A, according to aspects of the present disclosure.

FIG. 11 is a perspective view of a flashing for use with a tile roof, according to embodiments of the present disclosure.

FIG. 15 is a perspective illustration of the system of FIG. 14, after a flashing cap has been installed thereon.

FIG. 16 is a perspective illustration of the system of FIG. 15, after a sealing cap has been installed over the flashing cap.

FIG. 17A is a first perspective view of an alternate flashing system for use with a tile roof, according to aspects of the present disclosure.

FIG. 17B is a second perspective view of the alternate flashing system of FIG. 17A.

FIG. 17C is a third perspective view of the alternate flashing system of FIG. 17A.

DETAILED DESCRIPTION OF THE INVENTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

As used herein, certain terms identify the relative position of structural element on a roof. In particular, the terms "up-roof", "north", and "upper" can understood in context to refer to elements on a roof higher up on the slope of the roof than the reference object or structure. Similarly, the terms "down-roof", "south", and "lower" can understood in context to refer to elements on a roof lower down on the slope of the roof than the reference object or structure. Further as used herein, the terms "side-to-side", "lateral" and "east-west" refer to elements occupying a space or moving generally horizontally at about the same location along the slope of a roof. Also as used herein, the terms slate flashing and tile flashing refer to embodiments of the presently disclosed flashing system, configured for use with slate roofs and tile roofs, respectively. In can be understood, however, that the flashing system herein can be applied with any roof structure having a repeating, overlapping, or headlapping tiling course, or the like.

Figure 1:
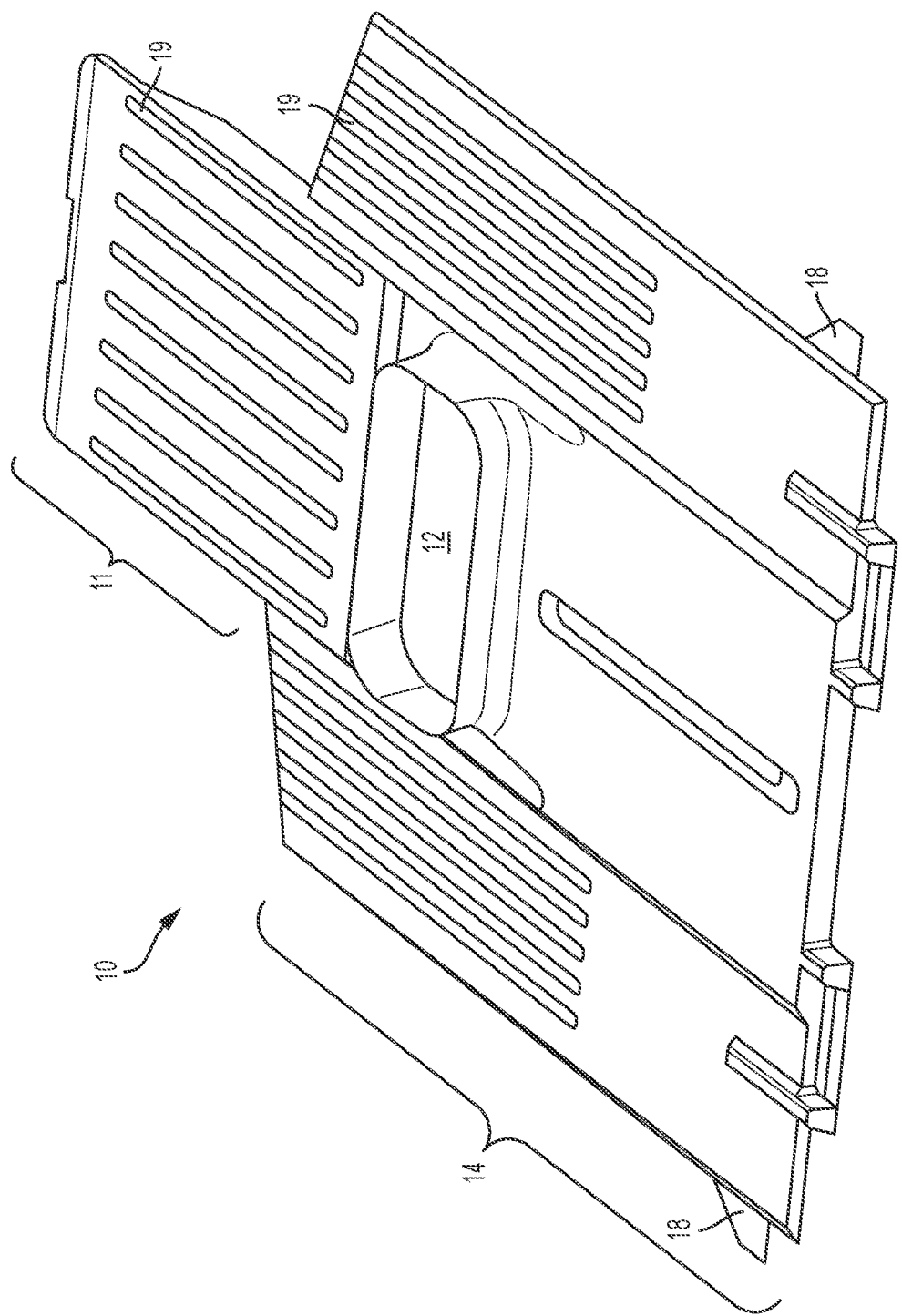
FIG. 1 is a perspective view of a flashing for use with a slate roof, according to embodiments of the present disclosure.

FIG. 1 is a perspective view of a flashing for use with a slate roof, referred to herein as slate flashing 10. In some embodiments, slate flashing 10 can be used to replace three (3) roof slates of a slate roof and provide a system to accommodate a support for a mounting rail to pass therethrough. One advantage of slate flashing 10 is that slate flashing 10 assists in preventing water leakage into the roof after a plurality of slates used for building the roof have been removed, and a photovoltaic mounting rail system has been installed onto the roof structure in the location where the three roof slates have been removed. While shown in an embodiment for replacing three slate roof members, slate flashing 10 can be sized to fill a space left by the removal of two slate roof members, or more than three slate roof members.

FIG. 1 shows upper tab region 11 and lower body region 14. Both upper tab region 11 and lower body region 14 can include channels 19, which may be formed within the upper exterior surface of these regions, and slate flashing 10 as a whole. Lower body region 14 can further include fins 18 extending outward laterally from the sides of lower body region 14. Slate flashing 10 can be formed from plastics, metals (e.g. aluminum), alloys or any other like material. Depending on the chosen material, slate flashing 10 can have a thickness of about one-quarter of an inch (~¼ in.), although fully formed slate flashing 10 vary in height and contour such that upper tab region 11 and lower body region 14 of slate flashing 10 have an overall thickness/height of about one-half of an inch (~½ in.).

FIG. 1 also shows that slate flashing 10 can be shaped to have aperture 12, preferably having upwardly extending edges therearound. In some aspects, upwardly extending edges of slate flashing 10 can have upwardly facing edges, providing for a base upon which additional components can be supported. Aperture 12 (alternatively referred to as a "chimney") can be, for example, substantially rectangular, as shown, where in some aspects aperture 12 can have rounded corners. The upwardly facing elements of slate flashing 10 forming aperture 12 can have, for example, a height of about one inch (~1 in.), extending upward relative to upper tab region 11 and lower body region 14 of slate flashing 10. The height of upwardly facing elements of slate flashing 10 forming aperture 12 can be formed to ensure that a mounted photovoltaic array is as close to a roof as possible without touching the roof.

Upper tab region 11 of slate flashing 10 (alternatively referred to as the "nose" of a flashing) can be shaped and configured, for example, to fit at least in part underneath slate roof elements situated directly up-roof of slate flashing 10. Where upper tab region 11 is partially fit underneath slate roof elements of a roof, slate flashing 10 is further secured onto the roof such that slate flashing 10 is not as prone to being dislodged from the installation site, or blown off the roof by wind. Similarly, fins 18 of slate flashing 10, extending outwardly and laterally from edges of lower body region 14 can fit underneath laterally adjacent slate roof members. Where fins 18 are fit underneath slate roof elements of a roof, slate flashing 10 can be further secured onto the roof such that slate flashing 10 is not as prone to being dislodged from the installation site, or blown off the roof by wind. In some aspects, edges of lower body region 14 can be angled so as to partially fit underneath laterally adjacent slate roof elements of a roof.

Channels 19 can be formed into an upper surface of either or both of upper tab region 11 and lower body region 14 of slate flashing 10. Slate flashing 10 can be formed as a single piece, through processes including, but not limited to, stamping, pressing, injection molding, and the like. Channels formed in slate flashing 10 can be configured to direct precipitation downward along slate flashing 10, and around/away from aperture 12, so as to avoid any precipitation from getting underneath slate flashing 10 and onto the underlying structure of the roof. In some aspects, slate flashing 10 can be formed with weep holes to allow for drainage from underneath slate flashing 10, where the weep holes are located at or close to the lowest point of slate flashing 10 when installed on a roof.

Figure 2:
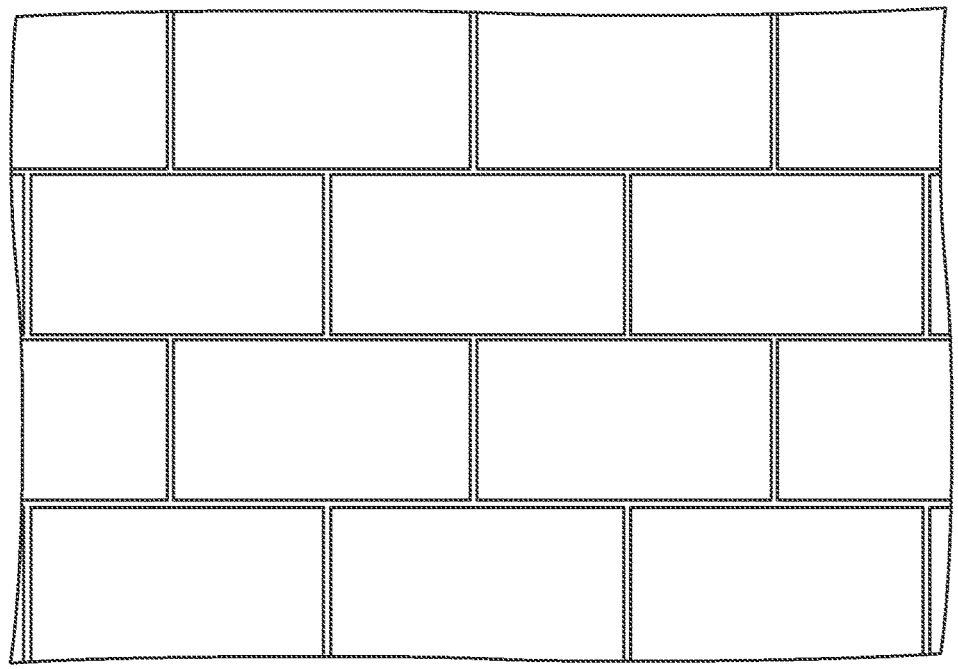
FIG. 2 is a top plan view of a slate roof prior to the removal of any slates.

FIG. 2 shows a top plan view of a slate roof prior to installation of the present system. In order to install a mounting rail support system on a slate roof structure, the installer first needs to remove several slates to access the roof structure, particularly rafters, battens, and the like, therebelow. After the installer has removed the slates and accessed the roof structure, a mounting rail support system can be installed onto the roof structure, as follows.

Figure 3:
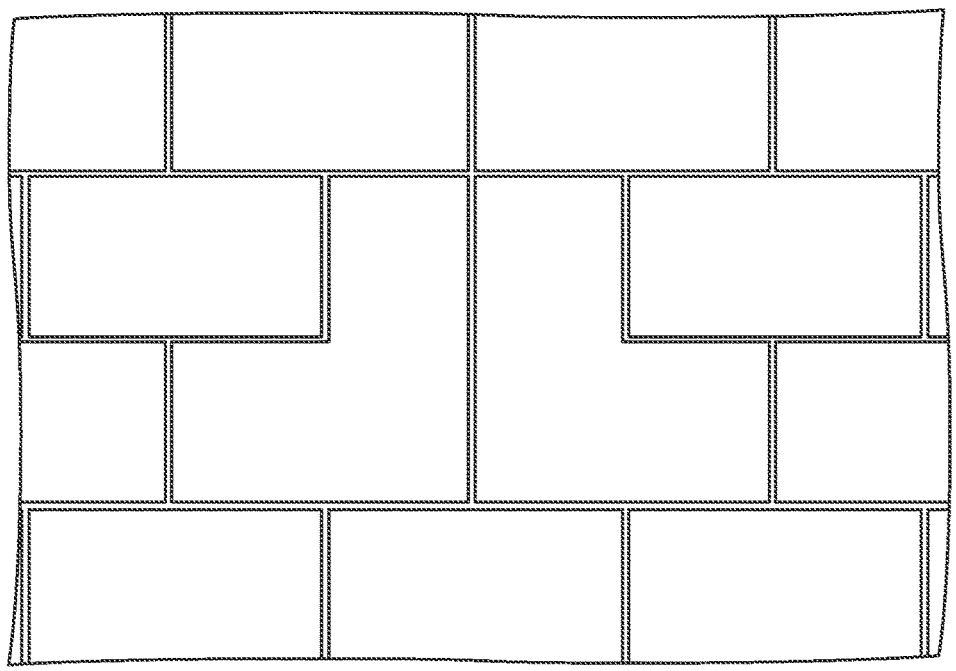
FIG. 3 is a top plan view of the slate roof of FIG. 2 after one slate has been removed.
Figure 4:
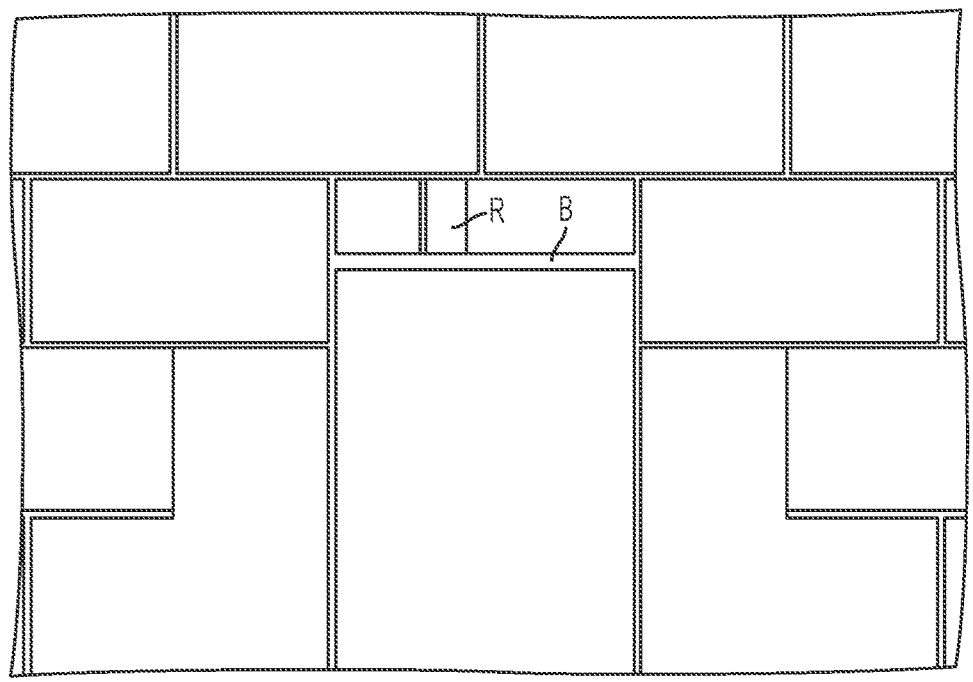
FIG. 4 is a top plan view of the slate roof of FIG. 2 after three slates have been removed.

FIG. 3 shows the slate roof after the removal of a first roof slate. As can be seen, removal of one slate does not yet give access to the roof structure therebelow because in various regions, slate roofs may comprise multiple layers of slate. Accordingly, as seen in FIG. 4, two more roof slates are removed, thereby removing three slates in total, and thus providing access to the underlying roof structure. In FIG. 4, rafter R and batten B can be seen and accessed. In some aspects, given the variability in individual roof constructions, other structural elements of a roof may be accessible after removing one, two, or three slate members of a slate roof.

Figure 5:
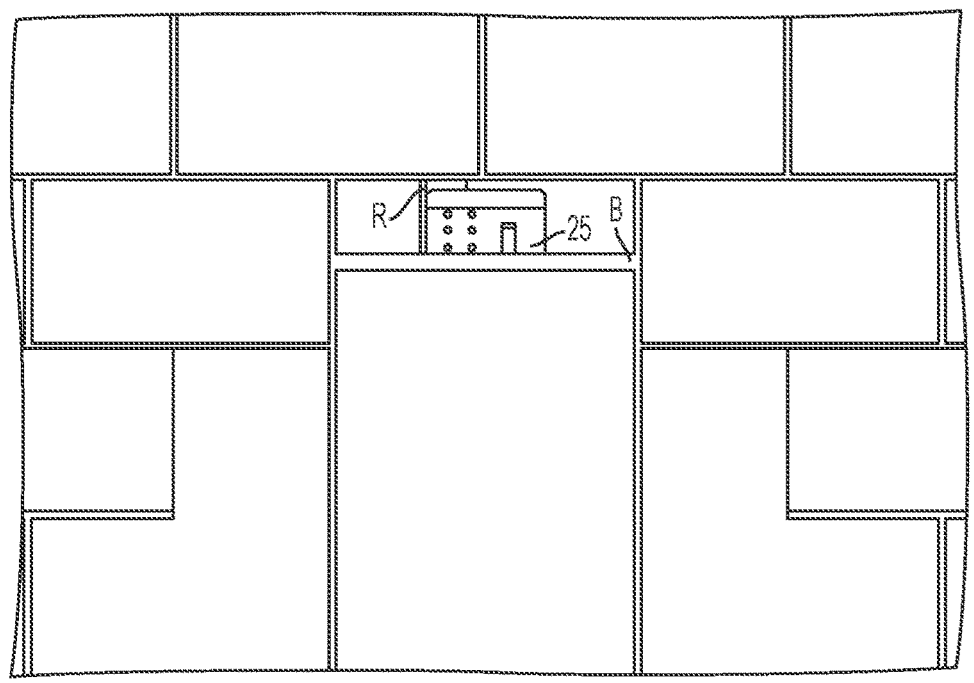
FIG. 5 is a top plan view corresponding to FIG. 4, after a slate roof mounting bracket has been installed.

Next, as shown in FIG. 5, mounting bracket 25 can be installed, for example by directly securing mounting bracket 25 to building rafter R with screws, bolts, nuts, and/or other fastening hardware. In some aspects, mounting bracket 25 can be particularly shaped to match rafters R as used for slate roofs. In other aspects, mounting bracket 25 can be set on a rafter R in between battens B of the slate roof.

Figure 5A:
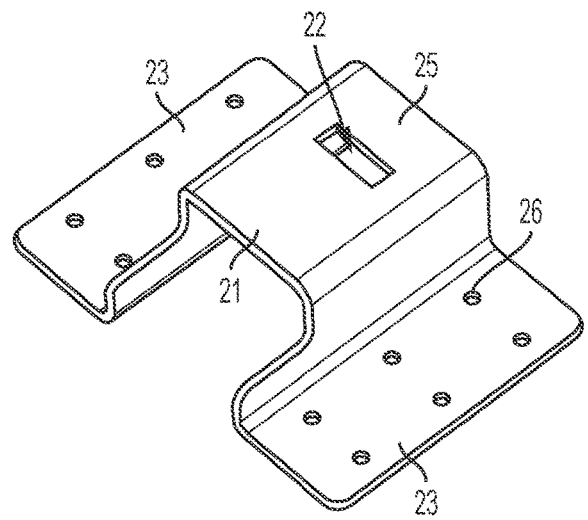
FIG. 5A is a perspective view of a first embodiment of a mounting bracket.

FIG. 5A provides for an isolated view of an embodiment of mounting bracket 20 that can be used with either of slate flashing 10 or tile flashing 10a (described below). The degree to which raised center portion 21 of mounting bracket 20 can be formed as higher than lowered end portions 23 can be based upon a known height of battens used for roofs. The height of raised center portion 21 relative to lowered end portions 23 can be selected and constructed for to accommodate various type and sizes of battens B on roofs, where raised center portion 21 is positioned above batten B and lowered end portions 23 are located on rafter R supporting batten B. Bracket slot 22 is provided as passing through raised center portion 21, where the height of raised center portion 21 relative to lowered end portions 23 can also be selected to allow for at least a portion of a support bolt or other structural support hardware to be located between mounting bracket 20 and a roof batten B for any given mounting assembly installation. In some aspects, as shown, raised center portion 21 can extend a fraction of the length of lowered end portions 23, in part allowing for access to the underside of raised center portion 21. In other aspects, raised center portion 21 can extend for as equal length as lowered end portions 23. In mounting bracket 20, bracket slot 22 being located on raised center portion 21 avoids potential physical conflicts with any rafter bolts that may be located within bracket holes 26 when installed on a roof.

Figure 5B:
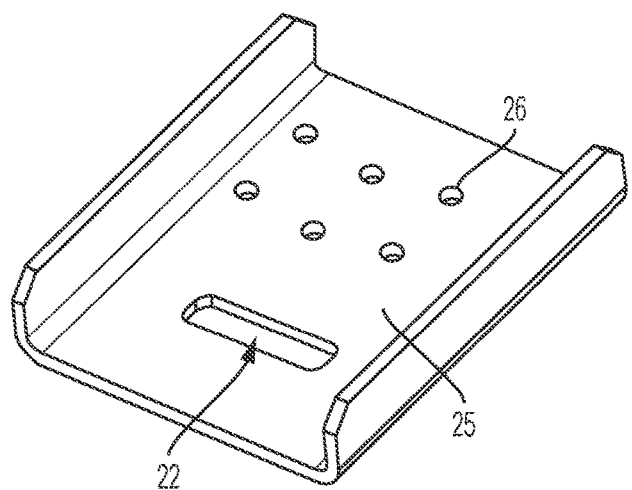
FIG. 5B is a perspective view of a second embodiment of a mounting bracket.

FIG. 5B provides for an isolated view of another embodiment of mounting bracket 25 that can be used with either of slate flashing 10 or tile flashing 10a. Mounting bracket 25 can have a primary surface in which bracket slot 22 and bracket holes 26 can be located. In such embodiments, bracket holes 26 should be sufficiently distant from bracket slot 22 so as to allow for support body 40 to rest over bracket slot 22 without physical conflict with any rafter bolts that may be used within bracket holes 26. Mounting bracket 25 can further have side walls extending upward along a dimension of mounting bracket 25, which can provide for structural stability and/or ease of handling during an installation.

Both embodiments of mounting bracket 20 and mounting bracket 25 can be formed of appropriate construction materials as known in the industry, including but not limited to: steel, aluminum, titanium, alloys, or the like.

Figure 6:
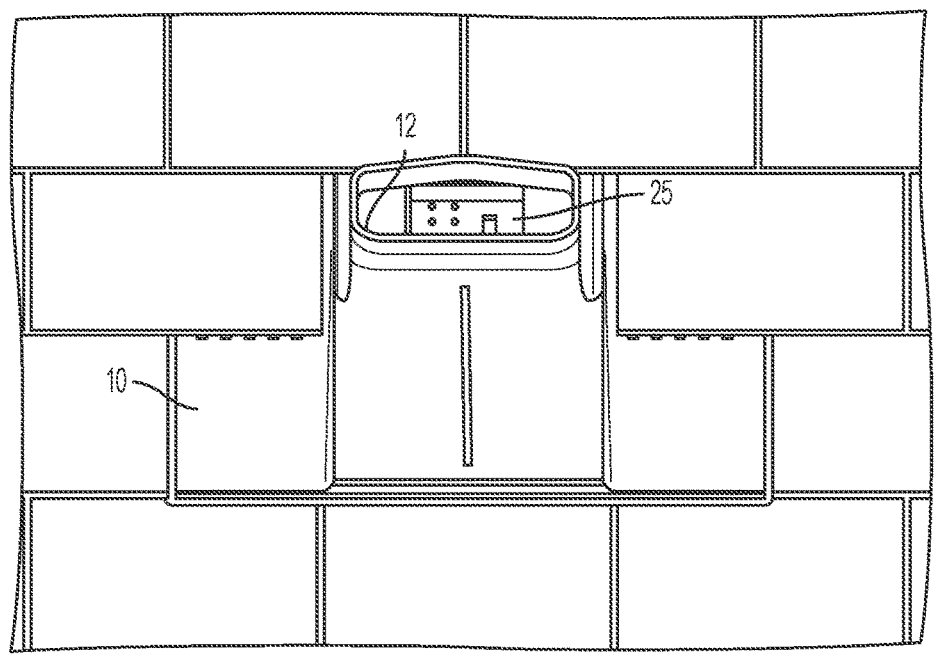
FIG. 6 is a top plan view corresponding to FIG. 5, after the flashing for a slate roof has been installed, according to aspects of the present disclosure.

Next, as shown in FIG. 6, slate flashing 10 can be placed on the roof and inserted so as to replace the three removed roof slates. Slate flashing 10 can be specifically shaped to replace three roof slates, with an upper edge of slate flashing 10 positioned underneath roof slates up-roof of slate flashing 10, and lower edges of slate flashing 10 passing over the top of roof slates down-roof of slate flashing 10. The overall area or span previously covered by the three roof slates can also be referred to as two consecutive tile courses (viewed north-south along the roof slope).

Figure 7:
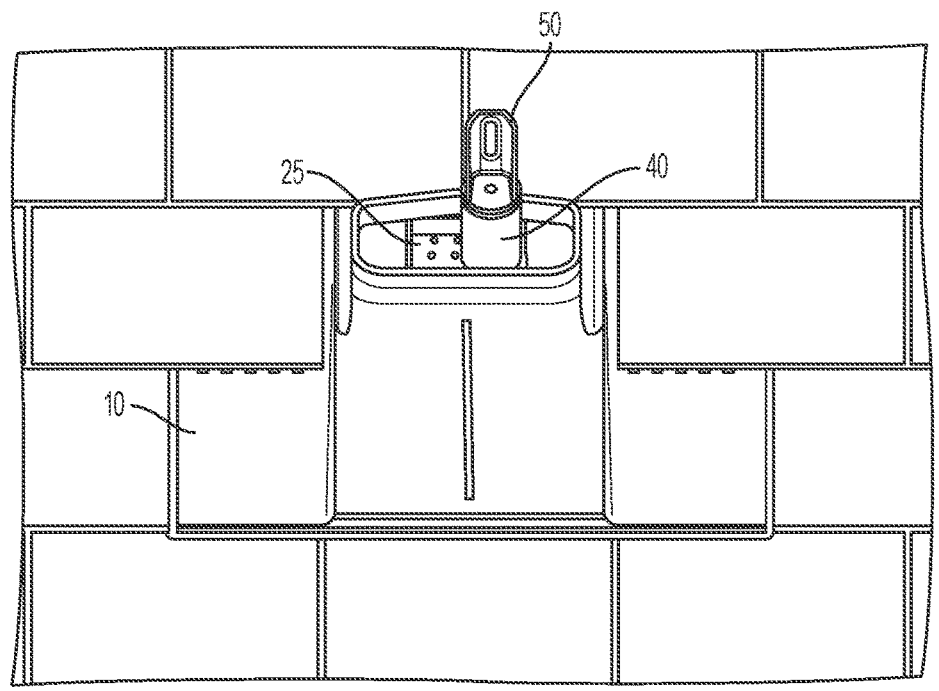
FIG. 7 is a top plan view corresponding to FIG. 6 after a cylindrical support body has been fastened to the slate roof mounting bracket, according to aspects of the present disclosure.

Next, as seen in FIG. 7, exemplary cylindrically shaped support body 40 for a mounting rail support assembly can be installed on top of mounting bracket 20. Support body 40 can be sized and positioned to pass through aperture 12. The position of support body 40 is generally set by the location of an underlying rafter R, and the corresponding attachment of mounting bracket 20 thereto. However, minor adjustment to the position, orientation, and angle of support body 40 can be made once support body 40 is positioned within aperture 12. Upper base 50 can be secured onto the top of support body 40, where upper base 50 can in turn be used to secure a photovoltaic mounting rail (as seen in FIG. 10A and FIG. 10B) thereto. In many aspects, support body 40 is cylindrical in shape, though in alternative aspects, support body 40 can be square, rectangular, triangular, hexagonal, octal, or have another shape as used in the industry.

The generally rectangular shape of aperture 12 permits the installer some room in which to position support body 40. In other words, the rectangular shape of aperture 12 allows slate flashing 10 to fit around support body 40, support body 40 being secured to mounting bracket 20 on rafter R, and thereby slate flashing 10 can be placed on a roof and accommodate the location of support body 40 as determined by where mounting bracket 20 is engaged with rafter R. This particularly important when, for example, the desired mounting location of bracket 20 is not centered within aperture 12. This is not an uncommon occurrence since the location of aperture 12 will be dictated by the tile layout, not the position of the underlying roof rafter. For example, support body 40 may be positioned closer to the right side of aperture 12 as shown in FIG. 7, should the building rafters and battens therebelow require this positioning. The relatively large size of aperture 12 (with respect to the relatively smaller and/or cylindrical size of support body 40) permits the installer a fair amount of lateral (or "side-to-side") adjustment. In contrast, a smaller amount of adjustment is permitted for movement along the slope angle of the roof (or "front-to-back" movement), since aperture 12 may have a relatively narrow amount of space along the slope angle dimension of slate flashing 10, as compared with the width support body 40 passing therethrough.

Figure 8:
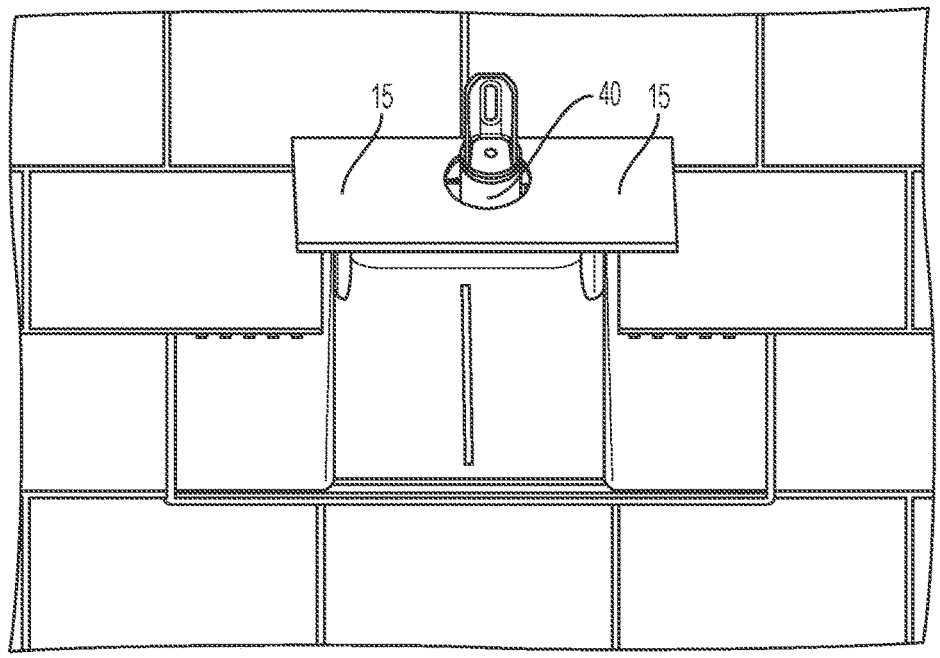
FIG. 8 is a top plan view corresponding to FIG. 7 showing a flashing cap installed over the hole in the flashing, according to aspects of the present disclosure.

Next, the upper opening of aperture 12 can be closed and sealed to prevent rain water from simply entering into the aperture and passing therethrough, thereby dripping into the roof structure therebelow. As shown in FIG. 8, flashing cap 15 can next be installed over top of aperture 12 to fully cover aperture 12. Optionally, flashing cap 15 can be made of metal to prevent flame ingress in the event of a fire. In such embodiments, flashing cap 15 formed of metal offers the advantage of making slate flashing 10 fire-safe.

As shown in FIG. 8, flashing cap 15 can be larger than aperture 12 in slate flashing 10. Flashing cap 15 can have center hole 16 (alternatively referred to as a second aperture, where aperture 12 can be considered a first aperture), configured to allow support body 40 to pass therethrough. As the installer positions support body 40 of mounting rail support system with respect to aperture 12, the position of flashing cap 15 can be determined. For example shown in FIG. 8, because mounting support body 40 can be positioned as biased to the right within aperture 12, flashing cap 15 can also be positioned biased slightly to the right, as shown, such that center hole 16 can allow support body 40 to pass therethrough. The exact position of flashing cap 15 can be set by the exact position of support body 40 which can pass through aperture 12 in flashing cap 15. Flashing cap 15 can seal and cover aperture 12 regardless of the exact position to which flashing cap 15 has been moved (again, as based on the position of exemplary cylindrical mounting rail support body 40 passing therethrough). In some aspects, the relatively over-sized dimensions of flashing cap 15 allow for flashing cap 15 to account for the position of support boy 40 wherever support body is situated within aperture 12 while still completely covering the upper opening of aperture 12. In many aspects, center hole 16 can form a second aperture that is configured to match a shape of support body 40, such that flashing cap 15 can fit securely around support body 40.

Figure 9:
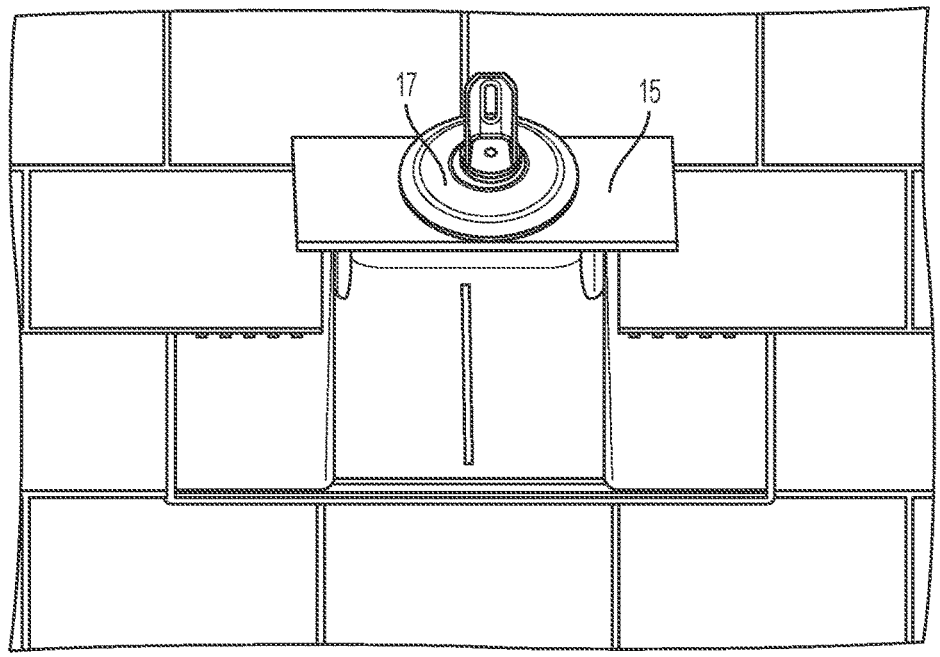
FIG. 9 is a top plan view corresponding to FIG. 8, showing a sealing cap installed over the flashing cap, according to aspects of the present disclosure.

Next, FIG. 9 shows how sealing cap 17 can be positioned around the mounting rail support body 40. For example, sealing cap 17 can be a ring-shaped structure having a space therein, which can be referred to as a third aperture (being the third aperture relative to aperture 12 of slate flashing 10 and center hole 16 of flashing cap 15). Thus, sealing cap 17 can cover center hole 16 within flashing cap 15, thereby preventing water from passing down through center hold 16 and aperture 12, and entering the roof structure. Flashing cap 15 and/or sealing cap 17 can be formed from one or more of plastics, metals, or alloys for example. Sealing cap 17 can further include rubber or foam elements to aid in forming a seal upon flashing cap 15.

Another embodiment of a flashing cap structure is shown in FIGS. 10A and 10B, as follows. In this embodiment, flashing cap 15a can be larger than aperture 12 and can mostly or completely surround and/or cover aperture 12 of slate flashing 10. Flashing cap 15a can define a region for covering aperture 12 that is large enough, particularly in a lateral dimension, such that flashing cap 15a can also be moved side-to-side to cover aperture 12 in various positions (like flashing cap 15). In this embodiment, flashing cap 15a can have outer edges that pass down around the upwardly facing edges around aperture 12 of slate flashing 10 to further prevent water from entering into the top of cylindrical support body 40, and draining down into the roof structure therebelow. Mounting rail 100 is also shown, mounted upon support body 40 and upper base 50, spanning above slate flashing 10.

FIG. 11 shows a perspective view of tile flashing 10a for use with a tile roof. As will be shown, tile flashing 10a can be used in some embodiments to replace four (4) roof tiles and also provide a system to accommodate a support for a mounting rail to pass therethrough. While shown in an embodiment for replacing four or more roof tiles, tile flashing 10a can be sized to fill a space left by the removal of three roof tiles, or more than four roof tiles. One advantage of tile flashing 10a is that it can assist in preventing water leakage into the roof after a plurality of building roof tiles have been removed, and a photovoltaic mounting rail system has been installed (similar to slate flashing 10, described above).

FIG. 11 also shows upper tab region 11a, main body region 14a, and lower tab region 11b which can include channels (not shown) in the upper exterior surface of these regions, and tile flashing 10a as a whole. Main body region 14 can further include fins (not shown) extending outward laterally from the sides of lower body region 14. Tile flashing 10a can be formed of plastics, metals (e.g., aluminum), alloys, or tile concrete, or the like. Tile flashing 10a can have a thickness, for example, of from about one-quarter of an inch to about one-half of an inch (~¼-½ in.), although fully formed tile flashing 10a can have changes in height and contour such that tile flashing 10a has an overall thickness/height about equal to that of concrete roofing tiles.

FIG. 11 shows that tile flashing 10a can be shaped to have aperture 12a, having upwardly extending edges therearound, as shown. The extending edges of tile flashing 10a can have upwardly facing edges, providing for a base upon which additional components can be supported. Aperture 12a can be substantially rectangular, as shown, where in some aspects aperture 12a can have rounded corners. The upwardly facing elements of tile flashing 10a forming aperture 12a can have a height of about one inch (~1 in.), extending upward relative to main body region 14a of tile flashing 10a. The height of upwardly facing elements of tile flashing 10a forming aperture 12a can be formed to ensure that a mounted photovoltaic array is as close to a roof as possible without touching the roof.

Upper tab region 11a, main body region 14a, and lower tab region 11b of tile flashing 10a can be shaped and configured to fit at least in part underneath tile roof elements adjacent to the respective regions of slate flashing 10. Where any one of upper tab region 11a, main body region 14a, or lower tab region 11b of tile flashing 10a are partially fit underneath tile roof elements of a roof, tile flashing 10a can be further secured onto the roof such that tile flashing 10a is not as prone to being dislodged from the installation site, or blown off the roof by wind. Upper tab region 11a, main body region 14a, and lower tab region 11b of tile flashing 10a can optionally be shaped and configured to fit flush next to tile roof elements adjacent to the respective regions of slate flashing 10. Where any one of upper tab region 11a, main body region 14a, or lower tab region 11b of tile flashing 10a are fit to be substantially flush next to adjacent tile roof elements, the fit between tiles and tile flashing 10a can have a frictional interface (i.e. be snug) such that tile flashing 10a is not as prone to being dislodged from the installation site, or blown off the roof by wind.

Figure 12:
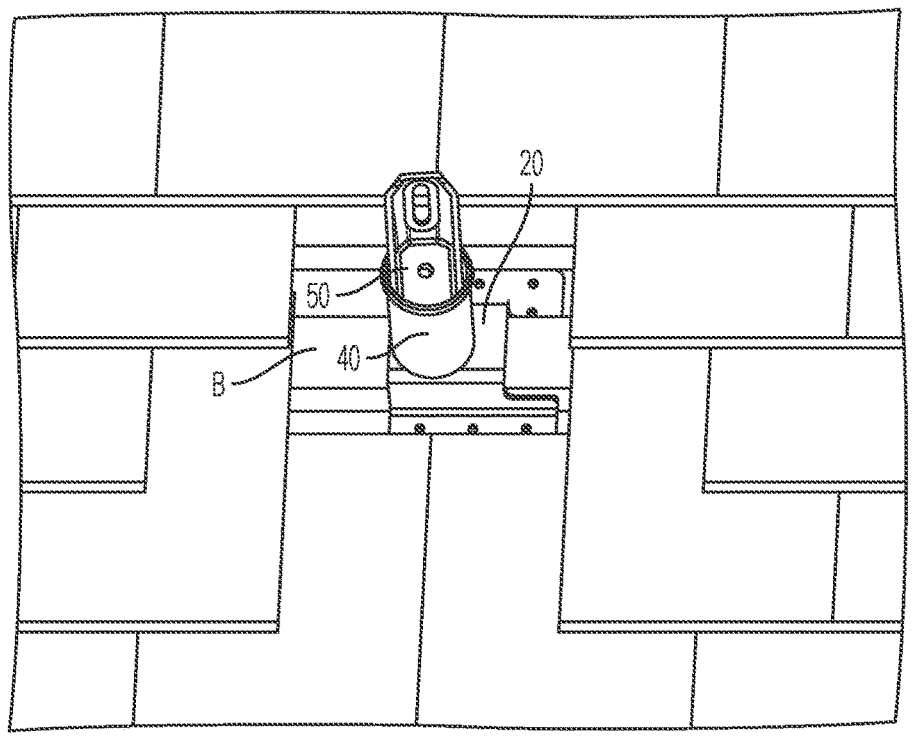
FIG. 12 is a top plan view of a tile roof with four tiles removed and a mounting rail support system installed over a roof batten, according to aspects of the present disclosure.

FIG. 12 shows a building roof after four tiles have been removed and tile mounting bracket 20 has been installed on top of roof batten B. Support body 40 can also be attached to mounting bracket 20, and where support body 40 can have a cylindrical shape. Upper base 50 of the mounting rail support system is also shown coupled on the top of support body 40.

Figure 13:
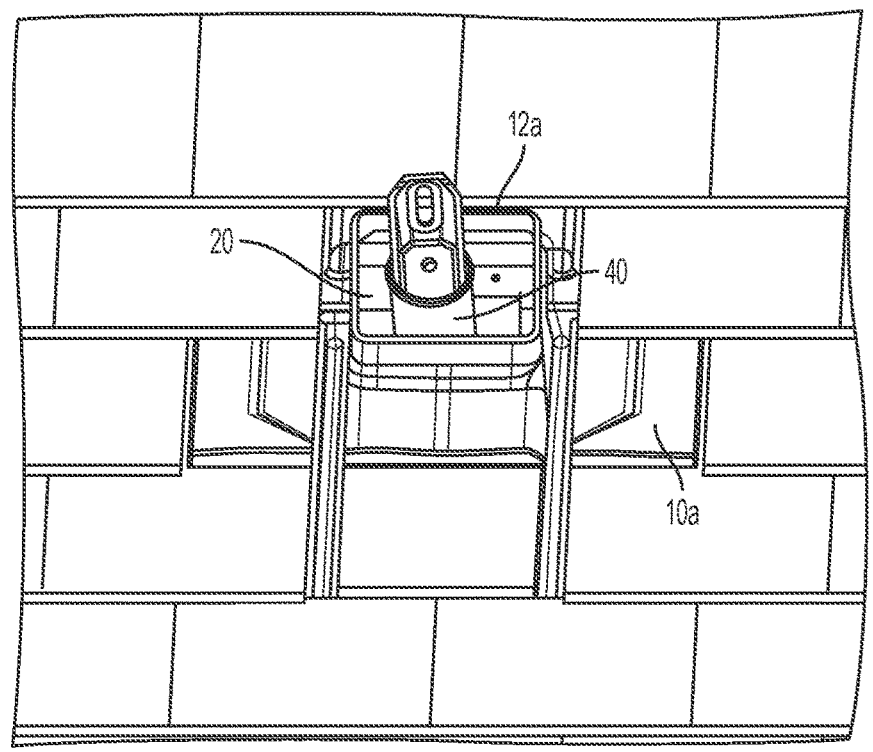
FIG. 13 is a top plan view corresponding to FIG. 12, after the tile flashing has been installed.

FIG. 13 shows tile flashing 10a installed to replace four removed building tiles, although more or less tiles may be replaced. Support body 40 extends upwardly through aperture 12a in tile flashing 10a. Support body 40 can also be positioned slightly to the left in aperture 12a due to the position of rafters R and battens B in the roof structure. Aperture 12a may be substantially rectangular or square (as shown), but may be any other shape that functions in a similar way. The overall area or span previously covered by the four roof tiles can also be referred to as three consecutive tile courses (viewed north-south along the roof slope).

Figure 14:
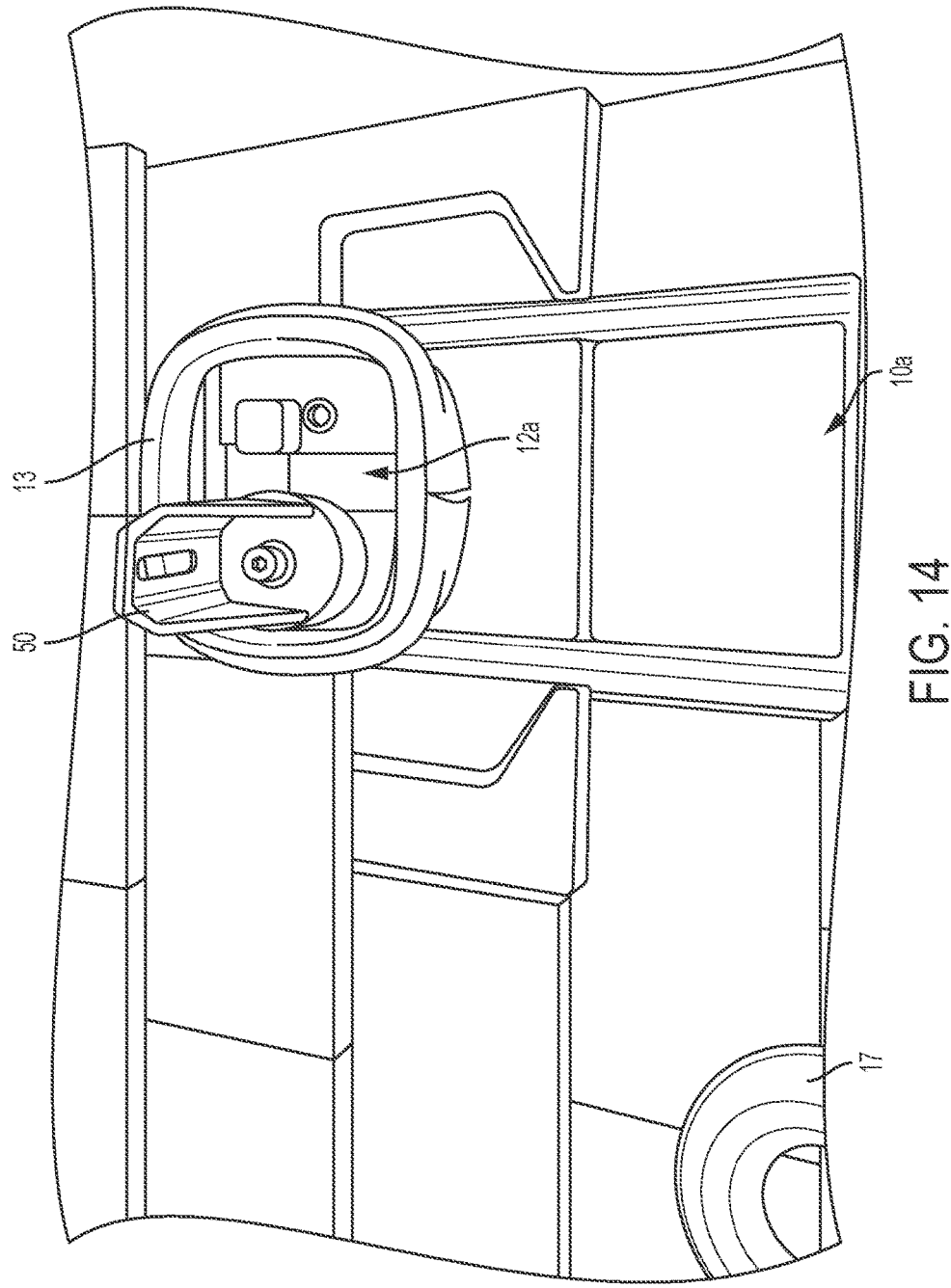
FIG. 14 is a perspective illustration of a system corresponding to FIG. 13.

The closure and sealing of aperture 12a can be accomplished, for example, by providing gasket 13, as shown in FIG. 14, around the raised upper edges of aperture 12a. Gasket can be made of rubber, plastics, solid foam, or the like. As shown, support body 40, and upper base 50 connected thereto, can be positioned far to the left in aperture 12a. This is a reflection of an advantage of the present system, in that the system permits for a wide variety of flexibility in the relative placement of tile flashing 10a to support body 40.

Next, FIG. 15 shows that flashing cap 15 can be positioned on top of gasket 13. Flashing cap 15 has center hole 16 (or second aperture) through which support body 40 of the mounting rail support system can pass through. In addition, center hole 16 can be somewhat wider than support body 40 so that support body 40 is positioned slightly to one side or the other of center hole 16. Finally, as shown in FIG. 16, sealing cap 17 can be received over center hole 16 to prevent rain water from passing down through center hole 16 and aperture 12a, and entering the roof structure. Sealing cap 17 can have a ring-like shape with a passage therethrough being a third aperture, where sealing cap 17 can be dimensioned to fit over and around either or both of support body 40 and upper base 50. In many aspects, center hole 16 can form a second aperture that is configured to match a shape of support body 40, such that flashing cap 15 can fit securely around support body 40.

FIGS. 17A to 17C show an alternate embodiment of a flashing cap structure. In this embodiment, flashing cap 15b is instead provided. FIG. 17B shows flashing cap 15b can also be larger than aperture 12a. Indeed, flashing cap 15b can define a region for covering aperture 12a that is large enough, particularly in a lateral dimension, such that flashing cap 15b can also be moved side-to-side to cover aperture 12a in various positions (as was also true with flashing cap 15 and flashing cap 15a, described above). In this embodiment, flashing cap 15b can have outer edges that pass down around the upwardly facing edges around aperture 12a of tile flashing 10a, to further prevent water from entering into the top of support body 40, and draining down into the roof structure therebelow. Mounting rail 100 is shown, mounted on mounting base 20, support body 40, and upper base 50, spanning above the present system.

In some embodiments, the present disclosure is directed toward a flashing system having several aspects. The flashing can be shaped or dimensioned to replace a plurality of roof tiles or roof slates. The flashing system can have an aperture passing through the flashing, the aperture having upwardly facing edges such that a flashing cap can be received over the aperture. The flashing cap aperture can also be dimensioned or shaped to allow a mounting rail support to pass through the flashing cap. The flashing system can further include a sealing cap receivable over the flashing cap. In some embodiments, the flashing can be a slate flashing that is dimensioned to replace two, three, four, or more than four slate roof members on a roof. In other embodiments, the flashing can be a tile flashing that is dimensioned to replace tow, three, four, or more than four tiles on a roof. In some aspects, the aperture passing through the flashing allow the mounting rail support system to pass therethrough, and also allow the position of the mounting rail support system to be adjustable within the aperture of the flashing. In some aspects, adjusting the position of the mounting rail support system adjusts the position of the flashing cap, but does not adjust the position of the flashing. In further aspects, the flashing cap can cover and seal the aperture in the flashing regardless of the position to which the flashing cap has been moved to adjust the position of the mounting rail support system.

The main or support body of the mounting rail support system can cylindrical, and a corresponding aperture or center hole in the flashing cap can also be cylindrical. In some embodiments, the aperture in the flashing is substantially rectangular, while in other embodiments, the aperture in the flashing is substantially square. In some aspects, aperture in the flashing has upwardly facing edges configured to receive a gasket around the perimeter of the upwardly facing edges. In some implementations, the flashing cap can be positioned on top of the gasket. In some aspects, the flashing cap can be made of metal. In some aspects, the flashing system can further include a sealing cap receivable over the flashing cap. In some aspects, the flashing cap can be larger than the aperture in the flashing and extends over the top of the aperture in the flashing. In some such aspects, the flashing cap can be moved side-to-side to accommodate the positioning of the mounting rail support system. In further aspects, the flashing cap can have outer edges that pass down around the upwardly facing edges round the aperture in the flashing.

In some embodiments, the present disclosure is directed toward a method of installing a flashing system on a slate roof, which can include (but is not limited to) the steps of removing three slate roof members from a slate roof, exposing at least one rafter of the slate roof, securing a mounting bracket to the at least one rafter, replacing the three removed slate roof members with a slate flashing, attaching a mounting rail support body to the mounting bracket through an aperture in the slate flashing, fitting a flashing cap over the aperture, where the flashing cap has a center hole that fits around the mounting rail support body passing, and sealing the center hole with a sealing cap that fits around the mounting rail support body and over the center hole. In some aspects, the method can also include adjusting the position of the mounting rail support body within the aperture.

In some embodiments, the present disclosure is directed toward a method of installing a flashing system on a tile roof, which can include (but is not limited to) the steps of removing four tile roof members from a tile roof exposing at least one rafter of the tile roof, securing a mounting bracket to the at least one rafter; attaching a mounting rail support body to the mounting bracket, replacing the four removed tile roof members with a tile flashing, the mounting rail support body passing through an aperture in the tile flashing, fitting a flashing cap over the aperture, where the flashing cap has a center hole that fits around the mounting rail support body passing, and sealing the center hole with a sealing cap that fits around the mounting rail support body and over the center hole. In some aspects, the method can also include adjusting the position of the mounting rail support body within the aperture.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flashing system for a photovoltaic (PV) mounting rail support assembly, comprising:
    a mounting bracket with a plurality of mounting holes for attachment to a roof component;
    a flashing having a body portion, at least one tab portion, and an opening with upwardly extending edges defining a first aperture passing through the flashing to reveal the mounting bracket, wherein the upwardly extending edges extend upward from the flashing;
    a mounting rail support assembly affixed to the mounting bracket and passing through the first aperture, wherein the first aperture is substantially rectangular with rounded corners;
    a flashing cap receivable to cover the upwardly extending edges defining the first aperture, wherein the flashing cap defines a second aperture for receiving an upwardly protruding support body of the mounting rail support assembly, and
    a sealing cap for sealing against the second aperture of the flashing cap, the sealing cap defining a third aperture configured for sealing against the upwardly protruding support body of the mounting rail support assembly.

2. The flashing system of claim 1, wherein the second aperture within the flashing cap is configured to match a shape of the support body.

3. The flashing system of claim 1, wherein the flashing is a slate flashing and is configured to replace three roof slates in two adjacent courses, wherein tab portion has a width substantively equal to one roof slate and the body portion has a width substantively equal to two slates and is offset from the tab portion.

4. The flashing system of claim 1, wherein the flashing is a tile flashing and is configured to replace four roof tiles, wherein the tile flashing has an first tab portion with a width substantively equal to one roof tile, a body portion with a width substantively equal to two roof tiles, and a second tab portion with a width substantively equal to one roof tile.

5. The flashing system of claim 1, wherein the first aperture passing through the flashing is shaped to accommodate the mounting rail support assembly passing therethrough, and wherein a position of the mounting rail support assembly is laterally adjustable within the first aperture in the flashing.

6. The flashing system of claim 5, wherein adjusting the position of the mounting rail support system adjusts the position of the flashing cap, but does not adjust the position of the flashing.

7. The flashing system of claim 6, wherein the flashing cap covers and seals the first aperture in the flashing regardless of the position to which the flashing cap has been moved to adjust the position of the mounting rail support assembly.

8. The flashing system of claim 1, wherein the main body of the mounting rail support assembly is cylindrical and a second aperture in the flashing cap is cylindrical.

9. The flashing system of claim 1, wherein the upwardly extending edges of the first aperture in the flashing further comprise upwardly facing edges forming a base with a perimeter.

10. The flashing system of claim 9, further comprising a gasket positioned around the perimeter of the base formed by the upwardly facing edges of the aperture in the flashing.

11. The flashing system of claim 10, wherein the flashing cap is positioned on top of the gasket.

12. The flashing system of claim 1, wherein the flashing is dimensioned to span two or more consecutive tile courses.

13. The flashing system of claim 1, wherein the sealing cap is generally ring-shaped.

14. The flashing system of claim 1, wherein the flashing cap is larger than the first aperture in the flashing and extends over a top of the first aperture in the flashing.

15. The flashing system of claim 9, wherein the flashing cap has outer edges that pass downward around the base formed by the upwardly facing edges of the first aperture in the flashing.

16. The flashing system of claim 15, wherein the flashing cap can be moved side-to-side to accommodate for positioning of the mounting rail support system.

* * * * *